(No Model.)

D. LEARY.
MANDREL FOR CIRCULAR SAWS.

No. 347,942. Patented Aug. 24, 1886.

WITNESSES
Wm A Lowe
T. Turner

INVENTOR
Daniel Leary
by his attorneys
Roeder & Briesen

UNITED STATES PATENT OFFICE.

DANIEL LEARY, OF GREENVILLE, NEW JERSEY, ASSIGNOR OF ONE-HALF TO SIMON SCHEUER, OF NEW YORK, N. Y.

MANDREL FOR CIRCULAR SAWS.

SPECIFICATION forming part of Letters Patent No. 347,942, dated August 24, 1886.

Application filed May 8, 1886. Serial No. 201,507. (No model.)

*To all whom it may concern:*

Be it known that I, DANIEL LEARY, of Greenville, Hudson county, State of New Jersey, have invented a new and Improved Mandrel for Circular Saws, of which the following specification is a full, clear, and exact description.

This invention relates to that class of mandrels having a conical seat for the accommodation of saws having eyes of different diameters; and it consists in the combination of parts adapted to firmly clamp the saw upon its seat, all as hereinafter more fully pointed out.

Figure 1:
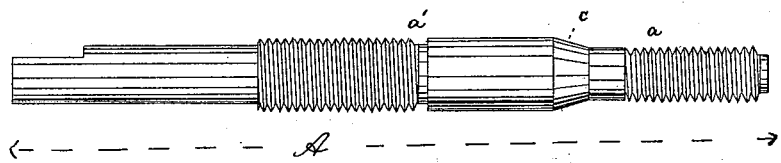
Figure 2:
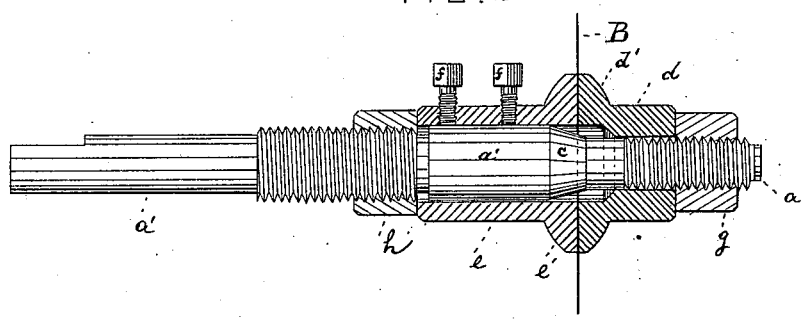

In the accompanying drawings, Figure 1 is a side view of the arbor or mandrel with the clamping devices removed. Fig. 2 is a sectional side view of the mandrel with such devices in place.

The letter A represents the arbor or mandrel proper, it being a shaft made with a contracted section, $a$, which is united to the main or enlarged section $a'$ by a conical seat, $c$. Both sections of the shaft are screw-threaded for a portion of their length, as shown.

$d$ is a tubular sleeve, embracing contracted section $a$, and free to slide thereon. The bore of this sleeve is enlarged opposite the conical seat $c$, so that the sleeve may be slipped partly over such seat, as shown in Fig. 2.

$e$ is a similar sleeve adapted to be slipped over main section $a'$, and of uniform bore. The sleeves $d$ $e$ are provided with annular heads $d'$ $e'$, adapted to bear against saw B, as shown. Through threaded perforations of the sleeve $e$ there extend two binding-screws, $f$ $f$, to fasten the sleeve upon the arbor.

$g$ $h$ are nuts adapted to engage the two threaded parts of sections $a$ $a'$, and to retain the sleeves in contact with the saw.

In use the saw B is slipped upon seat $c$, and then the smaller sleeve, $d$, is put in place over the section $a$, and crowded against the saw by nut $g$. Next the larger sleeve, $e$, is slipped over section $a'$, to come in contact with the saw, after which it is locked in place by its binding-screws $f$ and nut $h$. In this way the saw will be firmly held in place. The advantage of this construction is the facility with which the saw may be mounted and the firmness with which it is held. If the mandrel is not quite true, it may be readily adjusted by placing it in a lathe and taking a small portion off the seat $c$ at any point.

I am aware that circular saws have been attached upon conical sleeves placed upon the arbor; but in these cases the shoulder which holds in place one of the heads or clamping devices is rigid and not adjustable.

What I claim as my invention is—

1. The combination of mandrel A, composed of two threaded sections of unequal diameter and of an intervening conical seat, $c$, forming part of the mandrel, with the loose sleeve $d$ and nut $g$ adapted to embrace one of the sections, and with the loose sleeve $e$ and nut $h$ adapted to embrace the other section, and capable of being adjusted, substantially as specified.

2. The combination of mandrel A, composed of two threaded sections, $a$ $a'$, and conical seat $c$, intervening between the sections $a$ $a'$, with sleeve $d$, having head $d'$, and having a bore that is enlarged at one end, and with sleeve $e$, having head $e'$, and with binding-screws $f$, and nuts $g$ $h$, substantially as specified.

DANIEL LEARY.

Witnesses:
HENRY E. ROEDER,
ROBT. H. ROY.